H. WYMAN.

PHOTOGRAPH FILM PACKAGE.

APPLICATION FILED JULY 30, 1914.

Reissued Jan. 19, 1915.

13,871.

2 SHEETS—SHEET 1.

Witnesses:-
E. R. Llewellyn.
M. Hesse.

Inventor
Horace Wyman.
By John C. Dewey

H. WYMAN.
PHOTOGRAPH FILM PACKAGE.
APPLICATION FILED JULY 30, 1914.
Reissued Jan. 19, 1915.
13,871.
2 SHEETS—SHEET 2.
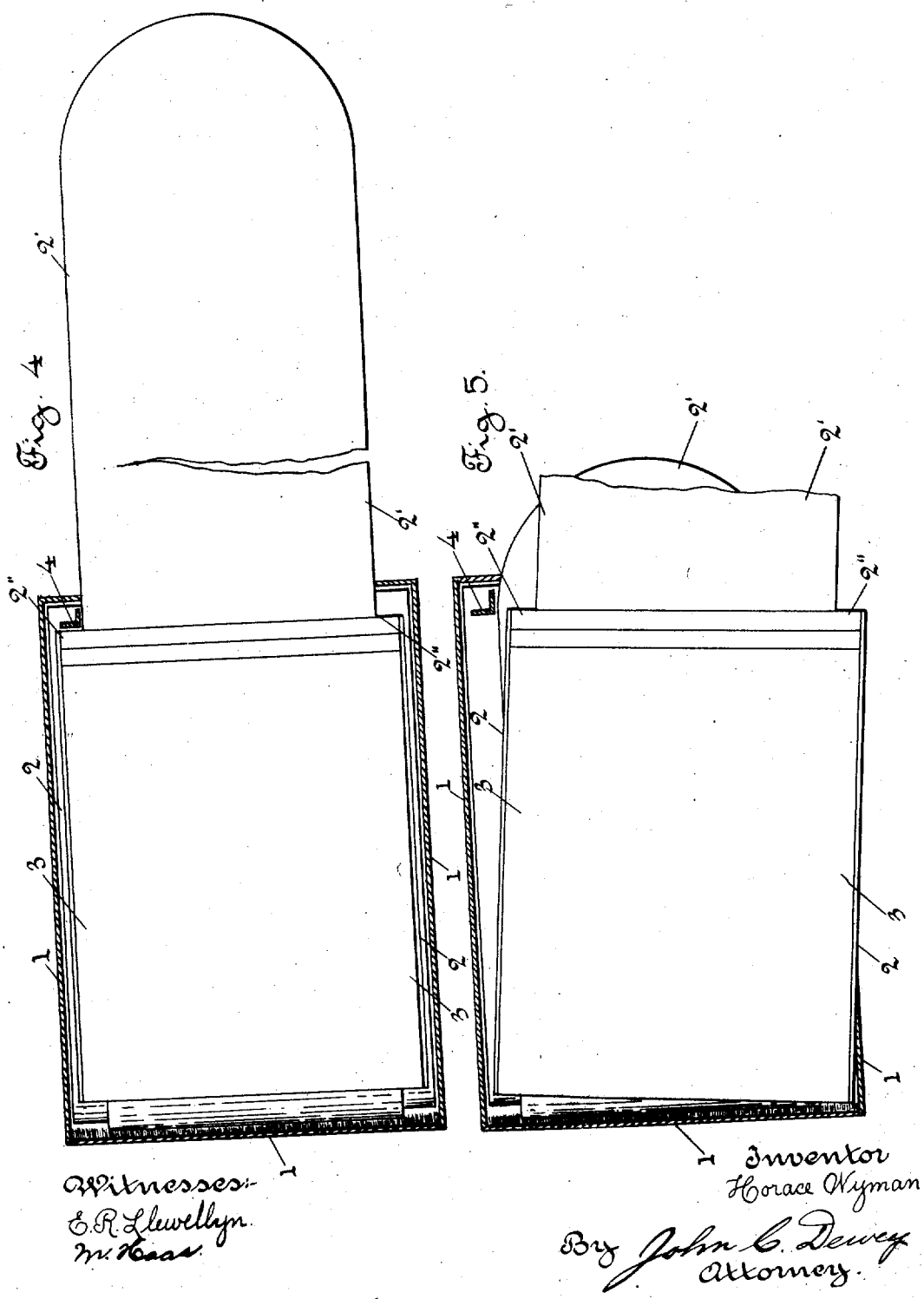
Witnesses:-
E. R. Llewellyn.
M. Haas.
Inventor
Horace Wyman
By John C. Dewey
Attorney.

UNITED STATES PATENT OFFICE.

HORACE WYMAN, OF WORCESTER, MASSACHUSETTS.

PHOTOGRAPH-FILM PACKAGE.

13,871. Specification of Reissued Letters Patent. Reissued Jan. 19, 1915.

Original No. 1,101,230, dated June 23, 1914, Serial No. 736,923. Application for reissue filed July 30, 1914. Serial No. 854,182.

*To all whom it may concern:*

Be it known that I, HORACE WYMAN, a citizen of the United States, residing at Worcester, in the county of Worcester and State of Massachusetts, have invented certain new and useful Improvements in Photograph-Film Packages, of which the following is a specification.

My invention relates to a photograph film package of the type in which the package is carried in a camera, and the films separately exposed, and moved into a light excluding storage chamber in the package, and afterward the package removed for development.

Each film is provided with a paper backing, and a tab which extends through the storage chamber, and out through an opening in the front, and by means of which each film is drawn into the chamber after exposure.

The object of my invention is to improve upon the construction of film packages of the type referred to, and more particularly to provide means, whereby one or more of the exposed films may be withdrawn from the storage chamber, without removing the package from the camera in which the exposure was made, or from an adapter, if one is used, as will be hereinafter fully described.

Figure 1:
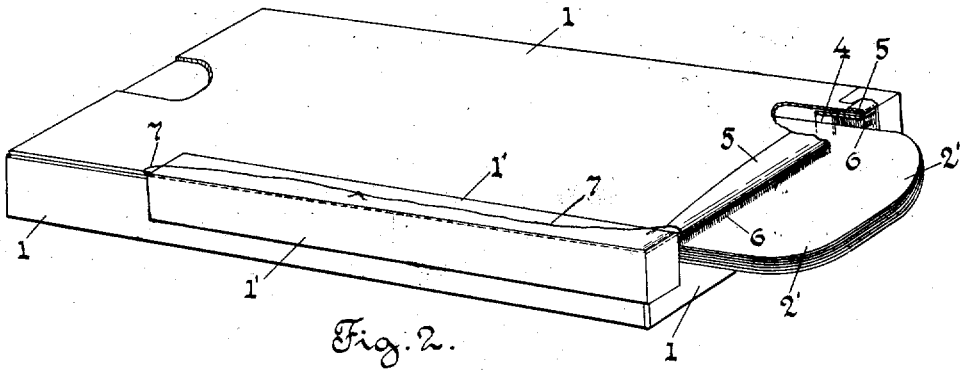
Figure 2:
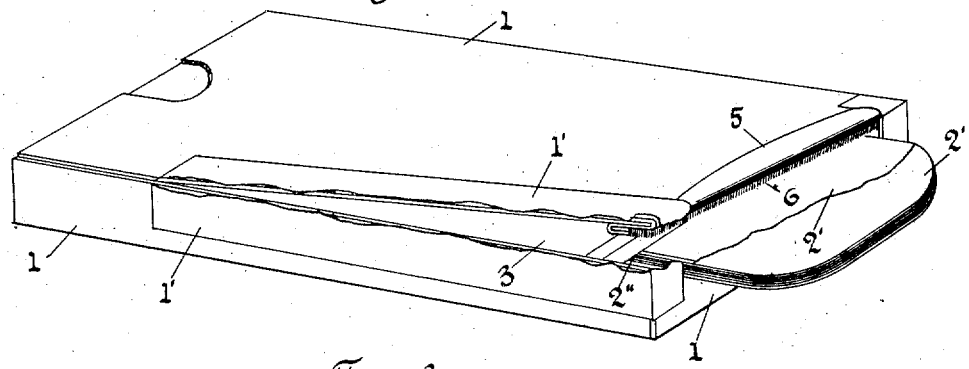
Figure 3:
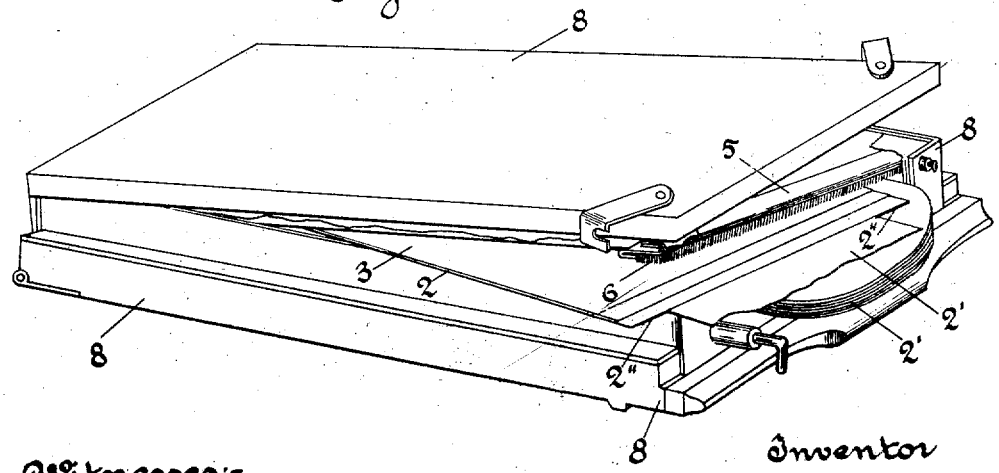

Referring to the drawings:—Figure 1 is a perspective plan view of the bottom or lower side of a film package, of the type referred to, embodying my improvements. The back cover of the package is partially broken away at one side of the open end. Fig. 2 corresponds to Fig. 1, but shows the back cover edge of the package, on one side, at the open end, broken apart. Fig. 3 shows the film package, shown in Fig. 2, inclosed in an adapter, said adapter being open at its front end, and a film and back sheet partially withdrawn therefrom. Fig. 4 is a central horizontal section through the package shown in Fig. 1, showing an exposed film withdrawn from the exposure chamber into the storage chamber, and the stop shoulder on the back sheet of the film engaging the stop abutment, on one side of the storage chamber at the open end thereof, and, Fig. 5 corresponds to Fig. 4 but shows the film partially removed through the side and open end of the package.

In the accompanying drawings, 1 is the film package, made of pasteboard, or other suitable material, and provided with an exposure chamber for the films, each film 3 having a paper back sheet 2, with a withdrawing tab 2′. Back of the exposure chamber is a dark storage chamber, having a back cover, and a partition between the two chambers, and the exposed films are drawn around the end of the partition into the storage chamber, by the back sheet 2 having its tabs 2′ passing through the storage chamber and projecting out through an opening in the front end.

The tabs 2′ are less in width than the films 3, and they leave a shoulder 2″ on the film, with its back sheet 2, at each side of the tab 2′, one of which shoulders 2″, when the film is fully withdrawn into the chamber, contacts with and is arrested by an abutment 4 in the line of movement of a shoulder 2″ on a film and back sheet. The stop abutment 4 is in this instance on one end of the stiffener bar 5, see Fig. 1, and said stiffener bar 5 has the light excluding material 6 thereon, in the usual way.

One of the edges of the back cover is severed from the side, at the corner opposite the abutment, for a distance along its side from the opening in which the tab 2′ passes through, and the back cover and the side are united and sealed by a supplemental paper strip 1′, as shown in Fig. 1, which strip may be easily torn, to allow the back cover to be separated from the side, as shown in Fig. 2, to allow the back cover to be raised, this separation may be made before the package is placed in the camera, if preferred.

By raising the hinged lid of the camera in which a film package is placed, or the lid of the adapter, if one is used, the front edge of the back cover can be raised to relieve the pressure upon the tabs, and the tab and its exposed film can then be detached from the abutment and removed from the package, all of which should be performed in the dark.

The film can be detached from the abutment by moving it sidewise from the abutment, with one edge passing into the open space between the back cover and side, when the seal is broken, and its opposite edge passing one side of the abutment as it is drawn out.

When the package is in the camera, and the hinged lid is closed and locked by the usual catches common to all cameras, the lid will press upon the front edge of the back cover of the storage chamber, and keep its front edge in close contact upon the tabs, whether the back cover has or has not been severed from the side, and if exposed films have been removed with the camera in the dark and the lid of the camera closed before exposure to the light, the front edge of the back cover will then remain securely protected from the light passing into the chamber, by the downward pressure of the lid upon it.

If the exposure of all of the films and their removal into the storage chamber is made before any are removed from the chamber, then the seal of the back cover can remain unbroken, and the package can be removed from the camera and another package substituted in the daylight; if however the seal be broken for the removal of some exposed films, then the camera should be taken into the dark where it can be resealed, and afterward brought into the light for other exposures.

In connection with the paper sheet 1′, I may use a thread 7, extending under said sheet, and by means of which the sheet may be torn to separate the back and side.

In Fig. 3, the film package is shown placed in an adapter 8; said adapter may be of any ordinary construction, and of the construction shown in Patent, No. 728,719, dated May 19, 1903.

In using my improved film package, place the package in the camera, and before closing the lid draw out the separating thread 7, tearing across the binding strip of paper 11, or otherwise separating the back cover from the side, then close the lid, with its front edge pressing upon the edge of the back cover and the tabs under it, excluding the light from the storage chamber when the exposed films are drawn therein; the camera is then ready for exposures to be made. The lid of the camera must always be kept closed after exposed films are in the chamber, except when in the dark and films are to be removed.

In tearing off the projecting tab of an exposed film, drawn into the storage chamber, there should be enough of the tab 2′ left projecting, (see Fig. 3), to be seized by the thumb and finger to withdraw the film from the chamber.

It will be understood that the details of construction of my improvements may be varied if desired.

The package may be made with side and back edges constructed in the usual manner, and subsequently severed by a knife or other means, before the withdrawal of the back sheet and exposed film.

The advantages of my improvements will be readily appreciated by those skilled in the art.

A single film, or any number of films, after exposure, may be withdrawn from the dark chamber of the film package for development, without removing the package from the usual adapter, or from the camera, if no adapter is used. This operation should be performed in the dark, with the package in the adapter, or in the camera, inserted within a bag, or used in a dark room.

Having thus described my invention, what I claim as new and desire to secure by Letters Patent is:—

1. In a photograph film package, having a dark storage chamber for exposed films, and open at the front end for the tabs of the film backing, and having one of the edges of the back cover, adjoining the open end severed from one side, and a binding strip over said severed edge, said binding strip adapted to be severed along said edge.

2. A photograph film package, having a dark storage chamber for exposed films, and an open end for the film backing tabs, and having one of the edges of the back cover, adjoining the open end, severed from one side, and a binding strip over said severed edge, said binding strip adapted to be severed along said edge, and means for severing said binding strip.

3. A photograph film package, having a dark storage chamber for exposed films, said chamber having a stop abutment in the line of movement of a stop shoulder on the film back sheet drawn into said chamber, and means to sever said package through the wall of said chamber, on one side adjoining the open end, to permit passage therethrough.

4. A photograph film package, having an exposure chamber, and a storage chamber for films, with a partition between the chambers, and an opening at the front end of the storage chamber for the projecting tabs of the film backings, said storage chamber having stopping means in the line of movement of stop shoulders on the films, when the latter are drawn into said chamber, the walls of said chamber being constructed of material adapted to be severed adjoining the open end, whereby the back cover may be raised to permit the detaching of the stop shoulders of the films from the stopping means, so that the removal of the films from the chamber may be effected.

5. A photograph film package, having an exposure chamber, and a storage chamber for films, the walls of the storage chamber being of material such that the edge of the cover may be severed from the side, there being a partition between the chambers, an opening in the front end of the storage chamber for the projecting tabs of the film backings, and abutting means in said chamber, adapted to engage with stop shoulders on the films, when the latter are drawn into the chamber, the films being adapted to be detached from the abutting means and withdrawn through the front of the chamber after the edge of the back cover is severed from the side and elevated.

6. A photograph film package, having an exposure chamber, and a storage chamber for films, with a partition between the chambers, and an opening at the front end of the storage chamber for projecting tabs on the film backings, there being abutting means in said storage chamber in the line of movement of the stop shoulders on the films, said abutting means adapted to arrest the films when drawn into said chamber, the shoulders on the backings being disengageable from the abutting means when the back cover is severed and raised from one side of the chamber.

7. A photograph film package, having an exposure chamber, and a storage chamber for films, with a partition between the chambers, and an opening at the front end of the storage chamber for projecting tabs on the film backings, the back cover for the storage chamber having its edge detachably connected with the side, and means in the storage chamber adapted to arrest a film when drawn therein, the film being releasable from the arresting means so as to be withdrawn from the package when the edge of the back cover is severed and raised from the side.

HORACE WYMAN.

Witnesses:
C. L. RICH,
SUSAN HENCHMAN.

Copies of this patent may be obtained for five cents each, by addressing the "Commissioner of Patents, Washington, D. C."